June 28, 1927.                                                    1,633,623
                          B. BOULOGNE
           AUTOMATIC WEIGHING APPARATUS WITH TARE WEIGHING
                        Filed March 9, 1926
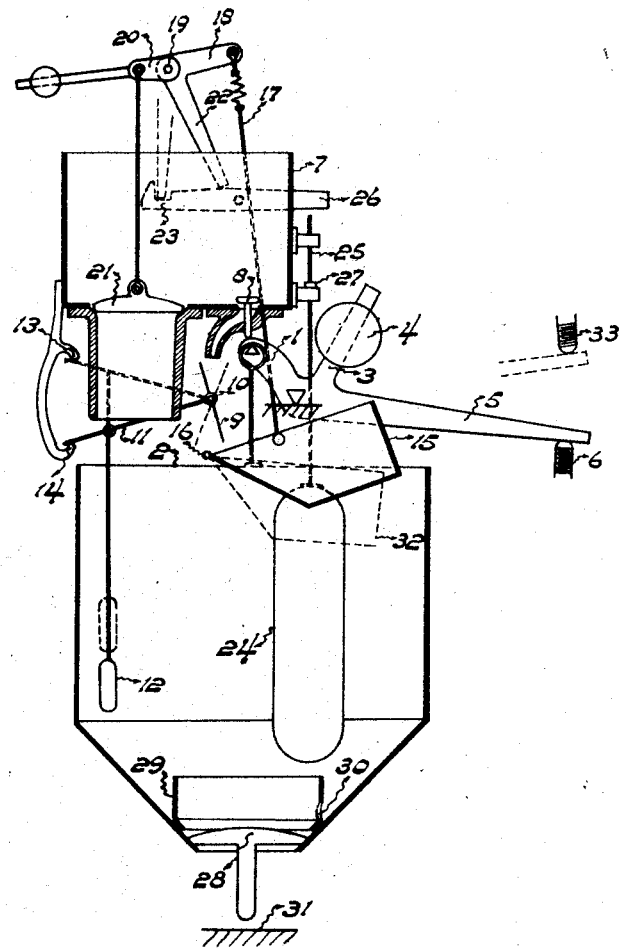
B. Boulogne INVENTOR
By: Marks & Clerk
           Attys.

Patented June 28, 1927.

1,633,623

UNITED STATES PATENT OFFICE.

BALTUS BOULOGNE, OF PASOEROEAN, JAVA.

AUTOMATIC WEIGHING APPARATUS WITH TARE WEIGHING.

Application filed March 9, 1926, Serial No. 93,486, and in the Netherlands February 6, 1925.

The invention relates to an automatic weighing apparatus with tare weighing by means of a bellcrank lever. Apparatuses of this kind are very complicated, so that the cost price is high and their handling and upkeep are not simple enough to the layman. It is therefore more advantageous to apply a simpler apparatus, and this requirement is complied with by the apparatus according to this application.

This apparatus has a bellcrank lever acting as a weighing beam which is adapted to supply intermittently at the movement resulting from a change from the discharging to the charging position and the reverse, the power required for the movement of the various members. For applying the bellcrank lever to this apparatus, it may be of a very simple construction and as the movement of the various members does not require much force, the bell crank lever makes only a very slight movement, so that a very simple buffer device can be used or it may even be entirely omitted.

The apparatus according to the invention is based on the principle that the weighing beam in attaining its extreme charging position opens a small supply valve or similar device. By the liquid flowing through this small valve a large valve or the like for quickly charging the weighing tank is opened by means suitable for the purpose whereas as soon as the charging of the weighing tank has attained a certain weight and the weighing beam begins to return to the discharging position, the small valve is automatically shut. When the weighing beam has attained the discharging position, a discharge valve or similar device is opened by the last portion of the movement of the weighing beam, which discharge valve is so arranged that the weighing tank can quickly discharge the greater part of its contents after which the remainder of the charge slowly flows out till this discharge valve closes by the return movement of the weighing beam to the charging position, causing a certain weight to be retained in the weighing tank.

The apparatus according to the invention has moreover a float or similar device provided in the weighing tank in such a way that in charging the weighing tank, the liquid present in it acts on this float with an upwardly pressing force, so that by this float with the aid of means suitable for the purpose, just before the charging of the weighing tank is completed, the large valve, which is opened by the liquid flowing through the small valve for quickly charging the weighing tank, is closed, so that the further charging of the weighing tank till the right weight is obtained is only effected by this opened small valve.

The aforesaid float may be shaped and provided in such a way that a difference in the specific weight of the liquid to be weighed does not cause closing of the large valve too early or too late.

In the annexed drawing an embodiment of the invention is shown, whereby the apparatus is drawn in the charging position, so that the small valve is open and the liquid may flow through it.

The arm 1 of the weighing beam carries a weighing tank 2, whereas the arm 3 of the weighing beam carries a weight 4; in the position drawn the tail 5 of the weighing beam rests on a stationary support 6. Above the weighing carrier 2 a receptacle 7 is arranged, in which a small valve 8 is provided, which is kept open in this position by the arm 1 of the weighing beam. Under the discharge spout of this valve 8 a screen 9 is arranged, pivotable around an axis 10, to which an arm 11, carrying a float 12 is connected. The extreme positions of the screen 9 are determined by stationary stops 13 and 14 against which the arm 11 comes to rest.

A receptacle 15 hingedly connected to a centre of rotation is suspended by means of the rod 17 to one arm 18 of a beam, pivotable around a shaft 19, of which beam the other arm 20 is connected to the large valve 21.

The beam 18—20 is provided with a downwardly directing arm 22, whereas a detent 23 is arranged in such a way that when the valve 21 is opened, said detent engages the arm 22 and so keeps the valve open. The receptacle 7 has a float 24, which may move up and down and is freely suspended in the weighing tank, which float has a rod 25, said rod pressing upwardly the arm 26 of the detent 23, when the float is being raised. The rod 25 has an adjusting ring 27 arranged in such a way that the float cannot touch the bottom of the weighing tank.

In the weighing tank 2 a discharge valve 28 is provided, around which an upstanding edge 29 in which an opening 30 is provided.

Under the discharge valve 28 a stationary stop 31 is arranged such that this valve abuts against this stop when the weighing tank tumbles over, whereby said valve is opened.

In the receptacle 15 an opening 32 is made, whereas above the tail 5 of the weighing beam a stationary support 33 is provided against which the tail comes to rest in the discharging position.

For weighing certain kinds of matter, as e. g. fresh water, kerosene and the like, the apparatus may also operate without tare weighing as disclosed in my prior United States Patent No. 1,435,693, and for this purpose only the upstanding edge 29 has to be removed, so that the weighing tank is quickly discharged entirely, causing increase of capacity.

The small valve 8 may be operated by the weighing beam, directly or by the aid of suitable means. The liquid flowing through said valve may open the large valve in other ways than indicated.

In order to easily close the large valve, a spring may be provided in the rod 17.

The apparatus operates as follows:

In moving from the discharging to the illustrated charging position of the weighing beam, the arm 1 of this beam has opened the small valve 8, so that the liquid in the receptacle 7 flowing through said valve into the receptacle 15 by its own weight, has opened the large valve 21 by means of the beam 18—20. The liquid flowing through the small valve continues to run into the weighing tank alongside the screen 9 and through the receptacle 15, which is discharged through the opening 32 and serves further as a kind of gutter until by the raising of the level in the weighing tank by means of the float 12, this screen is turned in such a way that the onflowing liquid flows at the other side along the screen and the receptacle 15 has the opportunity of draining away its contents.

In further charging the weighing tank, the rod 25 of the float will reach the arm 26 of the detent 23, when the charge is nearly completed and will push that arm upwards, causing the valve 21 to shut by its own weight, whereby the receptacle 15 returns in its former (upright) position. The further charging of the weighing tank is now effected only by the small valve 8 and is completed as soon as the weighing beam disengages this valve in its movement from the charging position to the discharging position. When the weighing beam has attained the discharging position and the tail 5 has come to rest against the support 33, the valve 28 is opened by the stop 31 and thus the discharge of the weighing tank begins.

In discharging the weighing tank the screen 9 occupies again its former position owing to the lowering of the float 12, so that with a subsequent opening of the valve 8 the liquid flowing through it will again enter into the receptacle 15. The weighing tank is discharged quickly until the level of the liquid has attained the upper side of the edge 29, after which the further discharge or the contents takes place slowly through the opening provided in that edge, until owing to the return of the weighing beam to the charging position, the discharge valve 28 is shut, so that the rest of the charge is retained in the weighing tank. In attaining the charging position the arm 1 of the weighing beam opens again the valve 8, so that a new charge flows into the weighing carrier.

I claim:

1. In an automatic weighing apparatus, a weighing tank, a weighing beam, a main and auxiliary admission valves for the material to be weighed, a device for opening the auxiliary admission valve by the movement of the weighing beam when the weighing tank returns empty to the charging position, a tank below the auxiliary admission valve movable by the weight of the on-flowing material, and a device acting in response to movement of the second mentioned tank to cause the opening of the main admission valve.

2. An automatic weighing apparatus as claimed in claim 1 characterized in that the last mentioned device includes a resilient connection.

3. An automatic weighing apparatus as claimed in claim 1 characterized by the provision of means for closing the main admission valve incident to the rising charge in the weighing tank.

4. An automatic weighing apparatus as cleamed in claim 1 characterized by the provision of means permitting tare weighing of the apparatus being rendered ineffective.

In testimony whereof I affix my signature.

BALTUS BOULOGNE.